US005508692A

United States Patent [19]

Wolfram

[11] Patent Number: 5,508,692

[45] Date of Patent: Apr. 16, 1996

[54] CENTRAL LOCKING INSTALLATION FOR A MOTOR VEHICLE

[75] Inventor: Berthold Wolfram, Regensburg, Germany

[73] Assignee: Siemens Aktiengesellschaft, Munich, Germany

[21] Appl. No.: 282,214

[22] Filed: Jul. 29, 1994

Related U.S. Application Data

[63] Continuation of Ser. No. 934,533, filed as PCT/EP91/00652, Apr. 5, 1991, abandoned.

[30] Foreign Application Priority Data

Apr. 6, 1990 [DE] Germany ........................ 90 106 583.9

[51] Int. Cl.$^{6}$ ................................ G06F 7/04; H04L 9/16

[52] U.S. Cl. ............ 340/825.310; 380/23; 235/382.500; 70/278

[58] Field of Search ......................... 340/825.31, 825.72, 340/825.69, 825.56; 380/23, 25, 46; 361/171, 172; 235/382.5, 382, 435, 439, 449, 451; 70/276, 277, 278

[56] References Cited

U.S. PATENT DOCUMENTS

| | | | |
|---|---|---|---|
| 3,860,911 | 1/1975 | Hinman et al. | 340/825.31 |
| 4,218,738 | 8/1980 | Matyas et al. | 340/825.31 |
| 4,288,659 | 9/1981 | Atalla | 340/825.31 |
| 4,509,093 | 4/1985 | Stellberger . | |
| 4,596,985 | 6/1986 | Bongard et al. . | |
| 4,686,529 | 8/1987 | Kleefeldt . | |
| 4,723,121 | 2/1988 | van den Boom et al. . | |
| 4,847,614 | 7/1989 | Keller | 340/825.31 |
| 4,857,914 | 8/1989 | Thrower | 340/825.31 |
| 5,029,209 | 7/1991 | Strong, Jr. et al. | 380/25 |
| 5,055,701 | 10/1991 | Takeuchi . | |

FOREIGN PATENT DOCUMENTS

| | | |
|---|---|---|
| 0292217 | 11/1988 | European Pat. Off. . |
| 2580128 | 10/1986 | France . |

*Primary Examiner*—Alyssa H. Bowler
*Assistant Examiner*—Mark H. Rinehart
*Attorney, Agent, or Firm*—Hill, Steadman & Simpson

[57] ABSTRACT

The invention relates to a central locking installation for a motor vehicle, having a transmitter (2), operating as a key, and a receiver (4), operating as a lock. When the transmitter (2) is actuated for the purpose of closing or opening the door locks, a signal (3) is transmitted to the receiver (4) and produces a control pulse (20) there. Each transmitter (2) has its own transmitter recognition signal and a stock of code words, from which the code words are taken in sequence and are transmitted. The receiver (4) carries out a transmitter allocation using the transmitter recognition signal. The invention is based on the object of the transmitter (2) seeking its transmitter recognition signal itself. This is achieved in that a transmitter recognition signal, which is stored in a transmitter store (12) and is transmitted together with a code word, is generated randomly in the transmitter (2). The receiver (4) has an evaluation circuit, by means of which the transmitter recognition signal is compared with transmitter recognition signals which are already stored and is stored as a legitimate transmitter recognition signal in a receiver store (18) if it is not already so stored.

21 Claims, 2 Drawing Sheets

CENTRAL LOCKING INSTALLATION FOR A MOTOR VEHICLE

This is a continuation, of application Ser. No. 08/934, 533, filed as PCT/EP91/00652, Apr. 5, 1991, abandoned.

BACKGROUND OF THE INVENTION

The invention relates to a central locking installation for a motor vehicle, having a controller and a remote actuating device, which installation is provided with at least one transmitter, operating as a key, and one receiver, operating as a lock, upon actuation of the transmitter for the purpose of locking or unlocking the door locks, a code word and a transmitter recognition signal are transmitted, and whereupon a control pulse is transmitted by the receiver to the controller which causes the locking or unlocking process. The receiver contains a coding device, by means of which a transmitter allocation is made according to the transmitter recognition signal.

Such a central locking installation is disclosed in German Patent Specification 3,244,049. In this case, a quantity of defined, different code words (stock of code words) are stored in the transmitter and in the receiver, which for their part are arranged in a sequence. When a control element is actuated, the transmitter transmits one of these code words, to be precise switching on through the sequence, starting with the first code word. A decoding device in the receiver correspondingly converts a received code word into an unlocking signal and supplies this to the controller. If the stock of code words is exhausted, a start is made at the first code word again, cyclically. If an embodiment having a plurality of transmitters is involved, but having different quantities of code words from transmitter to transmitter, the decoding device for processing these code words is equipped with a plurality of decoding channels corresponding to the number of transmitters. When the transmitter is actuated, a fixedly set recognition signal (transmitter recognition signal), depending on the transmitter, is transmitted which differs from the recognition signals of other transmitters and switches on the corresponding decoding channel in the receiver.

In the known central locking installation, both the transmitter recognition signal and the number of decoding channels, and hence the number of transmitters used in the central locking installation, must be known in advance. These data must have been set at the manufacturer's works, for example by programming. The user is thus confined to a predetermined number of keys from the start.

SUMMARY OF THE INVENTION

The invention is based on the object of modifying a central locking installation of the type mentioned initially such that the transmitter (key) seeks its transmitter recognition signal, which differs from the recognition signal of other transmitters, itself, and the maximum number of legitimate transmitters depends only on the size of the transmitter and receiver store.

This object is achieved by means of a central locking installation in which a random number generator in the transmitter of the remote actuating device produces a transmitter recognition signal, in the event of a legitimate initialization, which signal is stored in a transmitter store, in which the transmitter recognition signal is transmitted together with a code word from the transmitter to the receiver, and in which the receiver contains an evaluation circuit by means of which the transmitter recognition signal is compared, during initialization, with transmitter recognition signals that are already stored, and is stored as a legitimate transmitter recognition signal in a receiver store if it is not already so stored. Such a central locking installation is of simple construction, is cost-effective and is especially suitable for mass production.

A further advantage of this central locking installation is that no dialogue takes place between the key and the lock, that is to say there needs to be only a transmitter element, but no receiver element, in the key. Furthermore, a register in the key can be used as the random number generator. Because of the small number of components required in the key, the structural shape is determined largely by external criteria related to use, such as handiness.

BRIEF DESCRIPTION OF THE DRAWINGS

An exemplary embodiment of the invention is explained using the attached drawings, in which.

DETAILED DESCRIPTION OF THE PRESENTLY PREFERRED EMBODIMENTS

Figure 1:
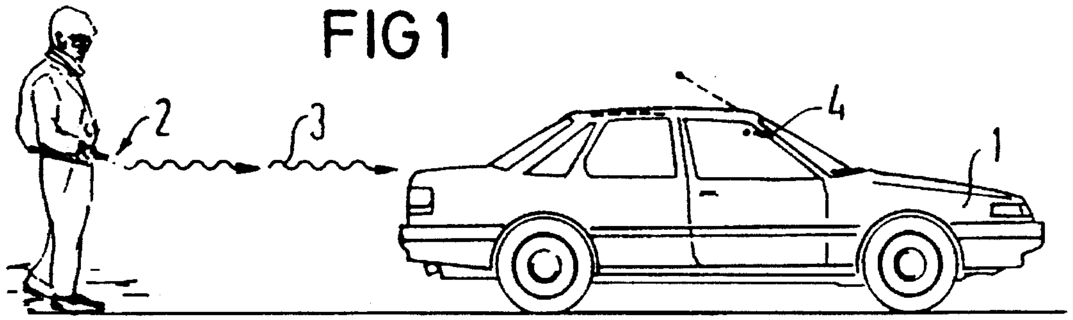
FIG. 1 shows a central locking installation according to the invention for a motor vehicle, having a transmitter and a receiver.

A motor vehicle 1 (FIG. 1) has a central locking installation which is actuated by a transmitter 2. On actuation of the transmitter 2 by a user, a signal 3 is transmitted to the receiver 4. The receiver 4 may be fitted outside the motor vehicle 1, for example on a vehicle door, or inside the motor vehicle, for example on the rear-view mirror.

In order to match a transmitter 2 to a central locking installation, the transmitter 2 and the receiver 4 must initially be put into an initialization mode. In this case, the receiver 4 is prepared by means of a predetermined setting of an electrical load in the motor vehicle 1 provided for this purpose, for example a car radio.

Figure 2:
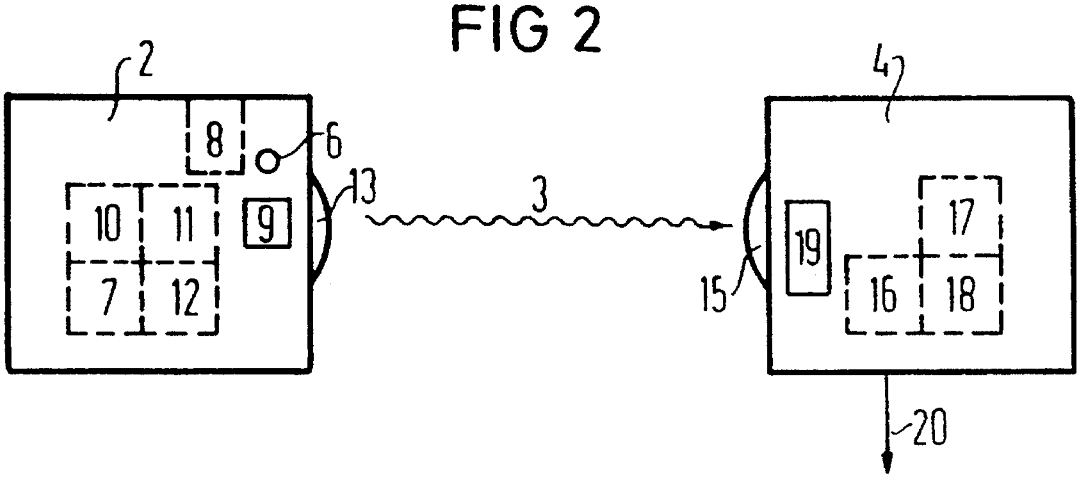
FIG. 2 shows the transmitter and the receiver of the central locking installation according to FIG. 1.

In order that the signals 3 transmitted between the transmitter 2 and the receiver 4 cannot be monitored inadvertently by third parties, initialization of the central locking installation can take place at a reduced transmitter power. The transmitter 2 must then be held at a distance of a maximum of ten millimeters from the receiver 4. Subsequently, a transmitter control element 6 (FIG. 2) designed as a push button here, is held depressed until an indicating element 9, which is controlled by a clock generator 7 and a counter 8, for example a light-emitting diode, illuminates for a predetermined time duration and hence provides the user with a clock for actuating the push button to carry out an initialization.

Figure 3:
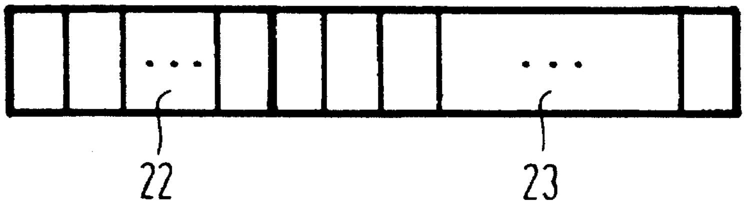
FIG. 3 shows the construction of a signal transmitted from the transmitter to the receiver of the central locking installation according to FIG. 1.

In a first initialization step, a plurality of random numbers are generated in a random number generator 10. The random number generator 10 is in this case integrated into a transmitter control circuit 11. In this case, the control circuit 11 is designed as a microprocessor and the random number generator as a register of the microprocessor. The register is incremented continuously after application of a supply voltage. The content of the register determines the random number when a push button is actuated. An origin code word (origin code) is formed in the control circuit 11 from a plurality of random numbers. The origin code modifies a predetermined mathematical formation law. The thus modified predetermined mathematical formation law (hereinafter "formation law") calculates a sequence for the code words of a stock of code words (changing code). The size of the stock of code words is also determined in this way. A further random number defines the transmitter recognition signal 22 (cf. FIG. 3) from a number of permissible transmitter recognition signals.

The transmitter recognition signal 22 and the origin code word are stored in a transmitter store 12 and are transmitted, without wires, for example by means of infrared radiation, by a transmitter element 13 to a receiver element 15 of the receiver 4. In the receiver 4, the received signal 3 is evaluated in a further receiver control circuit 17, which is supplied with clock pulses from a clock generator 16, and can be designed as a microprocessor. The origin code word informs the receiver 4 that an initialization is taking place. The received transmitter recognition signal 22 is taken over as a transmitter recognition signal that will be valid in the future and is stored in a receiver store 18. An acknowledgement signal is then emitted in the receiver 4, via a further indicating element 19, for example a light-emitting diode.

In the following initialization step, a further random number is used together with the origin code to calculate a starting code word. The starting code word is transmitted together with the transmitter recognition signal to the receiver 4 and is stored together with the transmitter recognition signal in the receiver store 18.

Figure 4:
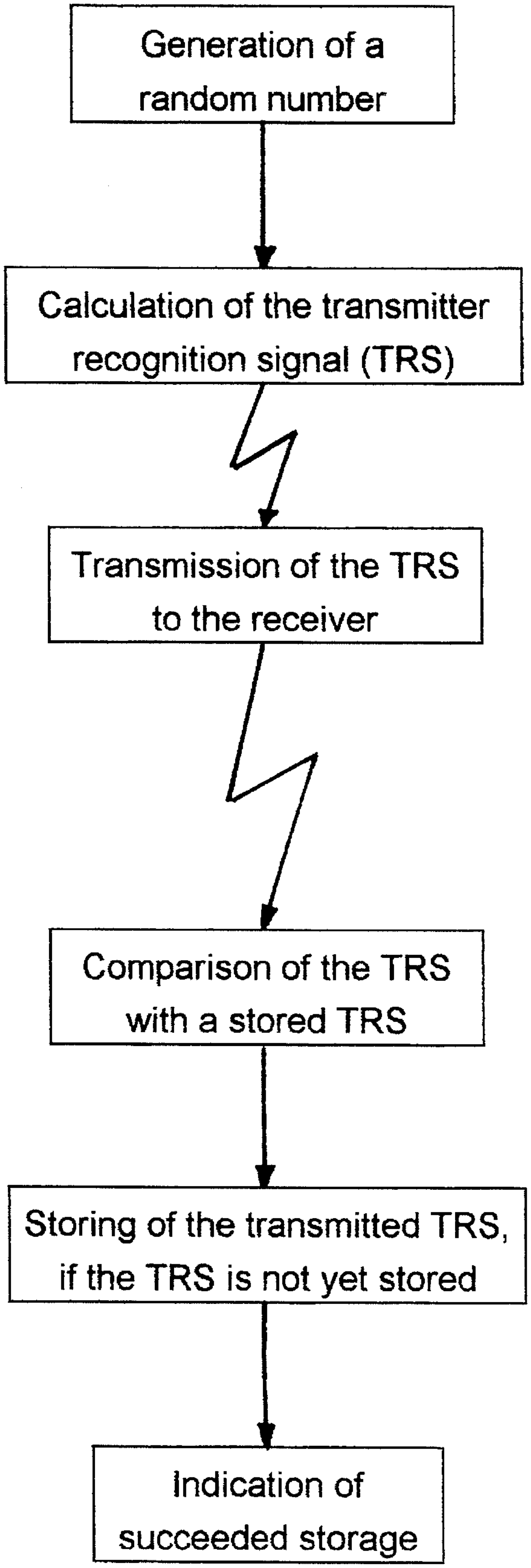
FIG. 4 is a flow diagram of the method of the present invention.

FIG. 4 illustrates a flow diagram of the initialization procedure of the present invention.

In a final initialization step, the first code word 23 of the changing code is produced in the transmitter 2, with the aid of the starting code word, using the formation law defined by the origin code. The starting code word is used, with the aid of the formation law, to define a first code word 23 (cf. FIG. 3) in sequence from the changing code, that is to say the first code word of the changing code to be transmitted is defined. This first code word is transmitted together with the transmitter recognition signal 22 to the receiver 4. The first code word 23, together with the transmitter recognition signal 22 is stored there, in the receiver store 18, as the starting word. With the aid of the formation law, the starting word is used to define the next code word which is expected in the receiver 4 after the transmission of the first code word 23. The central locking installation is now initialized to the extent that the transmitter 2 can be used to open or close the central locking installation.

Subsequently, further legitimate transmitters are initialized in the same manner, the origin code, the starting code word and the changing code differing, however, from those of other transmitters because of the method of random generation. In addition to this, during the first initialization step, in the transmitters which are still to be initialized, the transmitter recognition signal 22 is compared in the microprocessor of the receiver with any already existing recognition signals from other transmitters. If the identical transmitter recognition signal 22 is not yet stored, it is taken over as a future valid transmitter recognition signal and is stored in the transmitter store 18. However, if the identical transmitter recognition signal has already been stored by another transmitter 2 during an initialization which has been carried out previously, the receiver 4 does not emit an acknowledgement signal and the initialization must be repeated.

In the following initialization step, in the case of the transmitters 2 which are still to be initialized, the transmitter recognition signal 22 is checked in the receiver 4 for its legitimacy as a transmitter recognition signal of the central locking installation, and, if said legitimacy is given, the starting code word is stored in the receiver store 18 together with the transmitter recognition signal. In the final initialization step, the transmitter recognition signal 22 is first checked in the receiver 4 and is stored together with the first code word 23 of the changing code, after the starting code word, as the starting word in the receiver store 18. Using this procedure, all the transmitters which are approved for use with the central locking installation are now initialized.

In one advantageous version of the invention, the starting code word can be omitted. Only the origin code word defines the first code word of the changing code to be transmitted.

In normal operation, whenever the push button in the transmitter 2 is actuated, the changing code word transmitted immediately before that is, the immediately previous time the push button was actuated, is modified according to the formation law, that is to say the individual code words 23 are taken cyclically in sequence from the stock of words of the changing code whenever the push button is actuated. If the stock of code words is exhausted, the sequence starts with the first code word again. The code word 23 is transmitted together with the stored transmitter recognition signal 22 to the receiver 4. There it is tested to determine whether the transmitter recognition signal 22 is present. If the transmitter recognition signal 22 is legitimate, the starting word stored under this transmitter recognition signal in the receiver store 18 is modified according to the same formation law as in the transmitter 2 and is compared with the received code word 23. If the two code words correspond, a control pulse 20 is sent to the controller of the centrally-locked door locks in order to activate a closing or opening process. The received code word 23 is stored as the new starting word.

If the transmitter control element 6 is actuated, without the receiver 4 receiving a signal, for example in the-event of receiver interference or dummy actuations, the code word 23 is processed further only in the transmitter 2. In order that the central locking installation remains functional, the receiver 4 should react to received code words 23 which have already been calculated further in accordance with the sequence i.e., a number of calculations further ahead in the sequence, than the originally expected code word. To this end, the starting word is calculated further, up to a number of several subsequent code words (catchment range) in the receiver 4 and is in each case compared with the current received code word 23. If a code word in the catchment range corresponds to the current received code word 23, a control pulse 20 is then triggered. The size of the catchment range is dependent on the size of the stock of code words and on aspects relevant to security. In the present application example, the catchment range is between zero and ninety-nine code words. If the received code word 23, originating from the starting word, is outside the catchment range but within an expanded catchment range (resynchronization range), a control pulse 20 is sent to the controller only when the code word received immediately thereafter is the code word expected according to the formation law. In the present application example, the resynchronization range is between a hundred and a thousand code words. If a control pulse 20 is triggered, the received code word 23 is stored as the starting word, together with the transmitter recognition signal 22, in the receiver store 18.

The transmitted signal 3 (FIG. 3) consists of bits of the transmitter recognition signal 22 and of bits of the code word

23. The transmitter recognition signal 22 remains identical in the case of a key which has been initialized once and is stored in the transmitter store 12. The size of the stock of code words depends on the number of bits in the code word 23. In the case of a code word 23 having, for example sixty-four bits, a stock of code words results having $2^{64}$ different code words for the changing code. The code word 23 is modified after every push button actuation in the transmitter by means of the formation law, starting from the immediately preceding code word. This is stored as the starting word in the receiver 4 as soon as a control pulse 20 has been triggered. The origin code word, the starting code word or the changing code word can be transmitted as the code word 23.

The number of possible transmitter recognition signals 22 (key numbers) can be, for example, 14 and the number of approved keys can be 4. The key numbers can be coded such that they differ from one another by two bits. This largely prevents the changing code of a different key being used for comparison in the receiver 4 as the result of a bit error during transmission of the signal 3. During the initialization of the first key, the number "11", for example, is randomly generated as the key number, and is accepted and acknowledged by the receiver 4. The initialization of the second key results in the randomly generated key number "6". This is also accepted and acknowledged. During initialization of the third key, the randomly generated key number "11" is produced. This is not accepted by the receiver 4, since it has already been allocated to another key. An obligatory repetition of the initialization now results in the key number "2", which is accepted and acknowledged by the receiver 4. The larger the selection of key numbers available and the smaller the number of approved keys, the less probable it is that the initialization must be repeated because of a duplicated allocation of key numbers.

In one advantageous version of the invention, the special coding of the key number can be dispensed with. Instead, a test byte is produced in the transmitter 2 and is transmitted in the signal 3. The receiver 4 compares the received signal 3 with the signal to be expected, in which a test byte has also been produced in the receiver. If, for example, a changing code word to be transmitted consists of three bytes having the hexadecimal numbers "03", "02" and "04", the test byte is now produced by forming the sum of the digits of the three changing code bytes, and results in the hexadecimal number "09". The four bytes are transmitted to the receiver 4 in the code word 23. In the receiver 4, the three bytes of the expected changing code word and the sum of their digits are calculated. If the changing code bytes or the sum of their digits correspond, the received code word 23 is assumed to be valid. The comparison thus allows determination of whether a transmission error is present.

The term "transmitter" used in the above description is identical to the term "key" with respect to its construction and its function. In this case, the term "code" means an instruction which defines the properties of a quantity of "code words".

I claim as my Invention:

1. A remote lock apparatus for a motor vehicle having at least one lock, comprising:

a controller mounted to the vehicle for receiving a control pulse and connected to said lock for causing locking or unlocking of the lock;

a receiver mounted to the vehicle;

a remote actuating device having a transmitter;

means for switching said receiver from an operating mode to an initializing mode:

said transmitter transmitting a code word and a transmitter recognition signal to said receiver upon actuation of said transmitter;

said receiver transmitting said control pulse to said controller which cause the locking or unlocking of the lock;

said transmitter containing a random number generator producing said transmitter recognition signal during said initializing mode, and a transmitter store in which said transmitter recognition signal is stored, and a means for producing a supply of code words using a randomly modified mathematical formation law;

said receiver containing a memory and a receiver control circuit for comparing said transmitter recognition signal, during said initializing mode with preexisting transmitter recognition signals that are already stored within the memory, said control circuit automatically storing said transmitter recognition signal received from the transmitter as a legitimate transmitter recognition signal in said receiver memory only if not already so stored, and upon storing said transmitter recognition signal, said control circuit generating a new supply of code words, corresponding to said supply of code words produced by said means for producing a supply of code words at said transmitter, said new supply of code words assigned to said legitimate transmitter recognition signal; and during said operating mode said receiver control circuit receives said legitimate transmitter recognition signal and the code word from said transmitter and if said transmitter recognition signal is already stored as a legitimate transmitter recognition signal said receiver control circuit compares the code word to a next expected code word from said new supply of code words assigned to said legitimate transmitter recognition signal and if correspondence exists, said receiver transmits said control pulse.

2. The remote lock apparatus as claimed in claim 1, further comprising an indicating element and wherein the receiving control circuit is adapted to emit an acknowledgement signal to said indicating element if the transmitter recognition signal transmitted by the transmitter is not yet stored in the memory of the receiver.

3. The remote lock apparatus as claimed in claim 1, wherein the legitimate transmitter recognition signal stored in the memory of the receiver differs in at least two bits from any preexisting transmitter recognition signal of another transmitter.

4. The remote lock apparatus as claimed in claim 1, wherein test bits are transmitted in the signal from the transmitter, using which the receiver can identify whether a transmission error has occurred.

5. The remote lock apparatus as claimed in claim 4, wherein said means for producing contains a transmitter control circuit in which an origin code word is produced with the aid of at least one random word, during initialization, the random word being produced in the random number generator on actuation of a transmitter control element.

6. The remote lock apparatus as claimed in claim 5, wherein a predetermined formation law is modified by the transmitter control circuit during initialization with the aid of the origin code word, the origin code word determining initial conditions for a changing code of code words, and the thus modified formation law defining a sequence for the code words from a stock of words.

7. The remote lock apparatus as claimed in claim 6, wherein the transmitter contains a clock generator, using which a time duration is measured and communicated by means of an indicating element for the actuation of the transmitter control element during initialization.

8. The remote lock apparatus as claimed in claim 1, wherein the transmitter recognition signal and code word transmitted during initialization are transmitted at a reduced transmitting power compared to normal operating transmitting power for locking and unlocking the lock.

9. The remote lock apparatus as claimed in claim 1, wherein a control pulse is produced by the receiver when the code word received by the receiver is compared to and found within a first number of code words which follow a starting word in sequence, said sequence of code words predetermined at said receiver.

10. The remote lock apparatus as claimed in claim 9, wherein a control pulse is produced in the receiver when the received code word is outside the first number of code words but within a relatively large number of code words which follow the starting word in said sequence, and at least one subsequently received code word is the direct successor according to the sequence of code words predetermined at said receiver.

11. The remote lock apparatus as claimed in claim 1, wherein the means for producing contains a transmitter control circuit in which an origin code word is produced with the aid of at least one random word, during initialization, the random word being produced in the random number generator on actuation of a transmitter control element.

12. The remote lock apparatus as claimed in claim 11, wherein a predetermined formation law is modified by the transmitter control circuit during initialization with the aid of the origin code word, the origin code word determining initial conditions for a changing code of code words, and the thus modified formation law defining a sequence for the code words from a stock of words, the sequence defined identically at both the transmitter and the receiver.

13. The remote lock apparatus as claimed in claim 12, wherein the transmitter contains a clock generator, using which a time duration is measured and communicated by means of an indicating element for the actuation of the transmitter control element during initialization.

14. The remote lock apparatus as claimed in claim 13, wherein the signals transmitted during initialization are transmitted at a reduced transmitting power.

15. The central locking installation as claimed in claim 12, wherein a control pulse is produced by the receiver when the code word received by the receiver is compared and found within a first number of code words which follow a starting word in said sequence.

16. The central locking installation as claimed in claim 15, wherein a control pulse is produced in the receiver when the received code word is outside the first number of code words but within a relatively large number of code words which follow the starting word in said sequence, and at least one subsequently received code word is the direct successor according to said sequence.

17. A remote lock apparatus for a motor vehicle having at least one lock, comprising:

a controller means mounted to the vehicle for receiving a control pulse and causing locking or unlocking of the lock;

a receiver mounted to the vehicle;

a plurality of transmitters, separate from the vehicle each transmitter having transmitting means for transmitting a code word and a transmitter recognition signal to said receiver;

said receiver having means for sending said control pulse to said controller means for causing the locking or unlocking of the lock;

each said transmitter having means for randomly selecting a unique transmitter recognition signal during an initialization procedure, and a transmitter memory in which said transmitter recognition signal is stored;

each said transmitter having a means for creating a unique randomly modified formation law during the initialization procedure and means for generating a sequence of code words according to the randomly modified formation law, and means for transmitting said randomly modified formation law to said receiver to be stored in memory assigned to said transmitter recognition signal for the respective transmitter;

said receiver having means for recognizing a transmitter recognition signal transmitted by said transmitting means, and means for calculating an expected code word based on the modified formation law assigned to the respective transmitter recognition signal, and means for comparing the expected code word with a code word transmitted by the transmitter from the sequence of code words, whereby a correct correlation therebetween results in said means for sending said control pulse to issue said control pulse to said controller means.

18. The remote lock apparatus according to claim 17, wherein said means for calculating calculates a plurality of possible code words derived from said modified formation law and compares the transmitted code word to each of said plurality of code words.

19. The remote lock apparatus according to claim 17, wherein said means for calculating calculates a plurality of code words according to a sequence generated by the modified formation law and compares the transmitted code word to each of said plurality until a correct match is registered, but issues a control pulse to said controller only if the next transmitted code word received from the transmitter matches the next calculated code word calculated by said means for calculating according to the modified formation law.

20. The remote lock apparatus according to claim 17, wherein said receiver comprises a transmitter memory and recognition means, for comparing said transmitted transmitter recognition signal, during initialization, with transmitter recognition signals that are stored within said memory means, said recognition and memory means storing said transmitted transmitter recognition signal in said memory means only if said transmitted recognition signal is not already so stored.

21. A method of initializing a central locking system comprising the steps of:

given an authorized initialization, generating a new transmitter identifier by a random number generator, and storing this new transmitter identifier in a memory of the transmitter;

transmitting the new transmitter identifier and a random word from the transmitter to the receiver, forming a group of code words defined by a mathematical formation low modified the random word;

during the initialization, comparing the new transmitter identifier in the receiver to pre-existing transmitter identifiers already stored, and automatically storing the new transmitter identifier in a memory of the receiver when this new transmitter identifier has previously not been stored;

displaying a successfully implemented initialization to the user by a display element; and generating the group code words also in the receiver by said mathematical formation law modified by the random word.

* * * * *